Mar. 20, 1923.
G. P. GREGORY.
LIQUID GAUGE.
FILED APR. 21, 1920.
1,448,842.
2 SHEETS—SHEET 1.
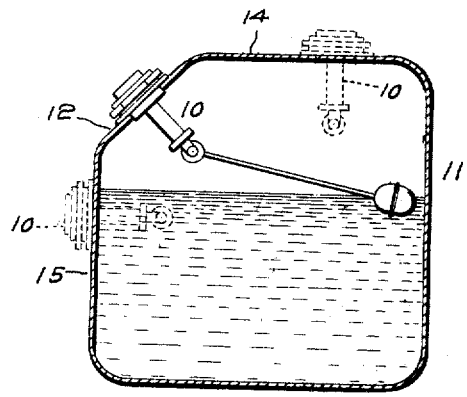
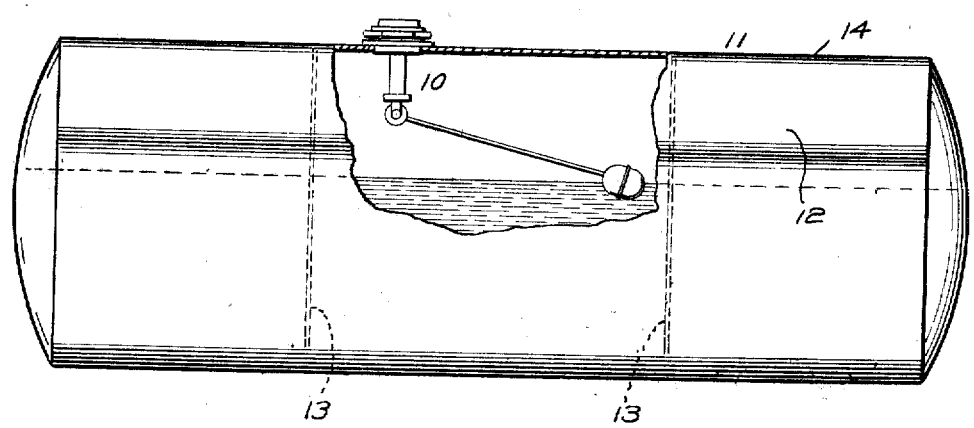

Mar. 20, 1923.
G. P. GREGORY.
LIQUID GAUGE.
FILED APR. 21, 1920.
1,448,842.
2 SHEETS—SHEET 2.
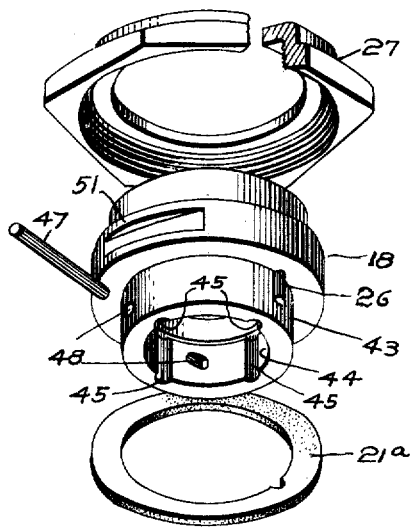
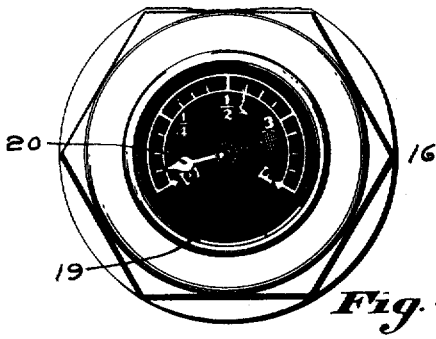
Fig. 4
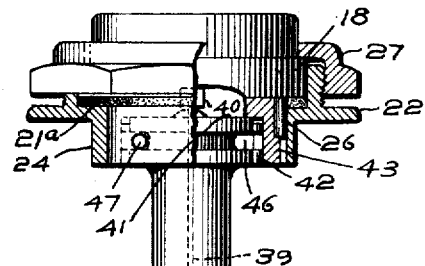
Fig. 5
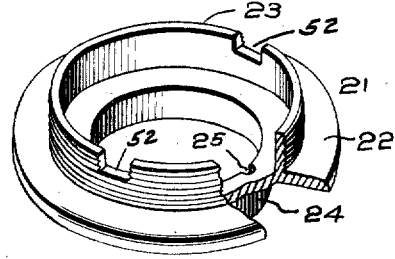
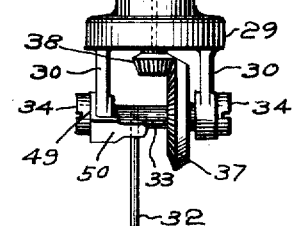
Fig. 6
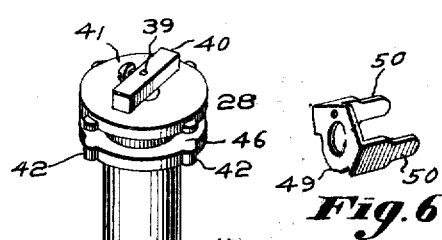
Fig. 3
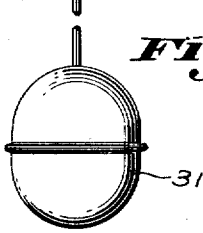
Fig. 7
Inventor
George P. Gregory
by Rob't O. Haine
Attorney Patented Mar. 20, 1923.

1,448,842

UNITED STATES PATENT OFFICE.

GEORGE P. GREGORY, OF BOSTON, MASSACHUSETTS.

LIQUID GAUGE.

Application filed April 21, 1920. Serial No. 375,495.

*To all whom it may concern:*

Be it known that I, GEORGE P. GREGORY, a citizen of the United States, and a resident of Boston, county of Suffolk and State of Massachusetts, have invented an Improvement in Liquid Gauges, of which the following description, in connection with the accompanying drawings, is a specification, like characters on the drawings representing like parts.

This invention relates to liquid gauges and more particularly to a liquid gauge which is so constructed that it is well adapted to meet the different conditions met with in installing the gauge in differently constructed tanks of the type now in use as fuel tanks upon automobiles and the like.

As is well known, different makes of automobiles, and other power driven vehicles now in general use, employ differently constructed tanks to supply fuel or a lubricant to the same, and this is true also of the different types of airplanes now in use.

Various forms of liquid gauges have heretofore been used, but in order to provide the different types of tanks with liquid gauges that will properly indicate the amount of liquid within the same, it has been necessary heretofore to manufacture differently constructed gauges to satisfy the requirement of the differently constructed tanks.

The fuel and lubricant tanks now in general use, vary not only in size and shape but also to a very considerable extent in the arrangement of the baffle plates and other structure within the tanks. Furthermore, different manufacturers prefer to mount the liquid gauge in different positions upon the tanks. Some manufacturers prefer to place the gauge upon the top of the tank intermediate the ends of the same, some prefer to place the gauge in a side of the tank, others in one of the ends of the tank, or in various other positions.

The liquid gauge forming the subject-matter of the present invention is of the type in which a float is provided with a stem or arm pivotally secured to a bracket, the movement of the float operates to move an indicator over a dial to show the amount of liquid in the tank. In this type of gauge the float should be free to swing approximately from the bottom to the top of the tank in order to correctly indicate the amount of liquid therein, but in order that the float and its arm or stem may swing freely through the desired arc, a relatively large unobstructed space within the tank is required. To obtain this space within the various tanks now in use, it is sometimes necessary to support the float so that it will swing in a vertical plane extending longitudinally of the tank, and sometimes in a vertical plane extending crosswise of the tank; furthermore, it is in some cases necessary to position the float so that its stem extends to one side of the supporting bracket, while in other cases it is necessary that the stem extend from the opposite side of the bracket. If the tank is high from the bottom to its top, but the space between the walls is narrow, the gauge will probably not have sufficient room to extend crosswise of the same and therefore must be mounted to swing in the longitudinal plane. In other tanks the baffle plates or other obstructions may prevent the gauge from swinging longitudinally of the same and therefore it must be mounted to swing transversely of the tank. When the gauge is to be mounted in a side wall of the tank or at an end of the same, still other conditions interfering with the free movement of the gauge may be met with.

In addition to the various conditions above mentioned which a gauge is required to meet in order that the same may be used in differently constructed tanks, the dial over which the indicator moves is usually required to be mounted so that the reading matter upon the same will stand in a vertical position with respect to the position from which it will normally be observed, and this arrangement is required irrespective of the position of the plane in which the float is to swing.

From the foregoing it will be seen that in order that a single type of gauge may be readily applied to different makes of tanks, it is necessary that the gauge be adapted to meet a number of different conditions.

An important object of the present invention, therefore, is to provide a liquid gauge, the parts of which are so constructed that the same may be readily assembled in different relations to each other to adapt the gauge for use in differently constructed tanks, or so that the gauge may be mounted in any one of a number of different portions of a tank. This is obviously very desirable because it enables the gauge manufacturer to make up a large number of standard gauge parts which may be kept on hand until an order is received for gauges to be used in a particular make of tank. The orders, in this manner, can be quickly and inexpensively filled, as compared to the practice heretofore where it was necessary to wait until an order was received and then design and manufacture a gauge which would meet the conditions imposed upon it by the construction of the tank for which the gauge was intended.

A more specific object of the invention is to provide a liquid gauge consisting of a head having an indicator, and a bracket for supporting a swinging float, and to so construct the head and bracket that they may be secured together in different predetermined angular relation to each other, in order that the float may be supported to swing in any one of a plurality of different directions relative to the head, to thereby adapt the gauge to the different conditions met with in applying the same to different types of tanks.

Other features of the invention and novel combination of parts in addition to the above will be hereinafter described in connection with the accompanying drawings which illustrate one good practical form thereof.

In the drawings:

Fig. 1 is a vertical transverse sectional view through a liquid containing tank, showing the gauge forming the subject-matter of this invention in full lines in one position, and in dotted lines in two other positions;

Fig. 2 is a side view of the tank shown in Fig. 1 having a wall thereof partially broken away in order to show the gauge within the tank;

Fig. 3 is a perspective view of the parts of the gauge dissembled but showing one part above the other in the order in which they may be assembled;

Fig. 4 is a top plan view of the gauge;

Fig. 5 is a side elevation of the gauge, parts of the same being shown in section;

Fig. 6 is a perspective view of a detail of the invention; and

Fig. 7 is an enlarged vertical section through the portion of the gauge to which the float is pivotally secured.

The liquid gauge forming the subject-matter of the invention is herein indicated in its entirety by the numeral 10, and this gauge is so constructed that it is adapted to be mounted in any one of a number of positions within a liquid tank 11 as will be apparent from Figs. 1 and 2. In the present case the tank 11 is shown as substantially square in transverse section, but has an inclined wall formed between one of the side walls and the top of the tank, as indicated by 12. This tank is also shown as having the customary baffle plates 13 mounted within the same transversely of the tank to prevent "side-swash" of the liquid therein.

In Fig. 1 the gauge 10 is shown in full lines as mounted in the inclined wall 12 of the liquid tank, but in order to indicate that this gauge is well adapted to be mounted in other positions, the gauge is shown in dotted lines as mounted within the upper wall 14 of the tank and also in dotted lines as mounted in a side wall 15, and in Fig. 2 the gauge is shown in full lines as mounted in the upper wall of the tank but nearer one of the baffle plates 13 than the other. If the tank 11 is used to supply fuel to an automobile and this tank is located, as is customary, at the rear of the automobile body, then, in all probability, the wall 15 of this tank will be the side wall seen by a person looking at the automobile from the rear of the same and the gauge 10, when mounted in any one of the positions indicated in Figs. 1 and 2, is usually unobstructed from the view of a person standing behind the automobile.

It is to be understood that the gauge 10 is well adapted to be mounted in tanks of various constructions other than herein shown, and this gauge may be mounted in various positions within the tank other than herein indicated.

In the embodiment of the invention illustrated, the liquid gauge 10 consists of a head 16 provided with an indicator, and a post or bracket 17 having a float pivotally secured thereto. The head 16, with the exception of the means for securing the same to the post 17, may be of well known construction, and consists of an indicator casing 18 having a dial 19 therein upon which the indicator or needle 20 is pivotally mounted, and positioned to cooperate with letters, numerals or graduations upon the dial. The indicator 20 is preferably of the magnetic type in which the needle is not positively connected to the mechanism which operates the same, but is controlled by a bar magnet positioned directly below the indicator and on the under side of the dial. This construction is very desirable because it prevents the vapor produced within the liquid tank from finding its way into the portion of the casing 18 in which the indicator is enclosed. The casing 18 is preferably mounted in a ring 21 having a laterally projecting flange 22 and an upwardly projected threaded flange 23. This ring is preferably also provided with a downwardly projecting collar 24 which may be inserted in a hole formed in a face of the tank and secured thereto by soldering or brazing the under face of the flange 22 to the outer face of the tank. Before the ring 21 is rigidly secured to the tank, the same should be rotated until the notch 25 formed within the inner wall of this ring bears a predetermined position to the longitudinal axis of the tank, as this notch cooperates with a pin or the like 26 upon the casing 18 to give the same the desired angular alignment with respect to the axis of the tank. After the ring 21 has been secured in the desired position upon a tank, the casing 18 may be fastened therein by screwing the threaded nut 27 upon the threaded flange 23 and a washer 21ª of felt or the like is preferably seated within the ring 21, as shown, between the same and the head or casing 18 to prevent the escape of the vaporized liquid between the ring 21 and the casing 18.

The post or bracket 17 may be given any suitable construction, but in the embodiment shown consists of a cylinder-like portion having enlarged opposite ends 28 and 29. Upon the end 29 at the lower portion of this post is preferably provided a pair of spaced downwardly projecting lugs 30 to which the float is pivotally connected. The float 31, which may be of any suitable construction, is provided with a relatively long stem 32 one end of which is rigidly secured to a transversely extending shaft 33, and this shaft, in the embodiment of the invention shown, is hollow and is pivotally mounted between the lugs 30 by screws 34 having threaded engagement with the lugs and extending inward through the same with the inner reduced ends 35 formed upon these screws extending into the hollow shaft 33. After the parts just described for pivotally securing the float to the post 17 have been assembled, the screws 34 are preferably prevented from backing out by pins 36 extending through the head of each screw and into the lugs 30. The rotary motion imparted to the shaft 33 by the rise and fall of the float may be satisfactorily imparted to the indicator 20 by rigidly mounting a bevel gear 37 upon this shaft which meshes with a bevel pinion 38 upon a rod or shaft 39 rotatably mounted within the post 17, and to the upper end of this rod is secured, in any desired position of adjustment, a bar magnet 40, a screw 41 being shown to secure this magnet to the upper end of the rod 39.

As above pointed out, an important object of this invention is to provide means for securing the post 17 to the head 16 in any one of a plurality of predetermined positions of angular adjustment and, in the embodiment of the invention illustrated, this is accomplished by providing the upper head 28 upon the post 17 with a plurality of lugs 42 preferably positioned at an angle of 90° to each other, and the indicator casing 18 is provided with a downwardly projecting collar 43 having a socket 44 formed therein, in the wall of which are formed longitudinally extending recesses 45 positioned to slidably receive the lugs 42, the arrangement being such that the indicator head 16 and post 17 may be assembled by inserting the upper end of this post in the socket 44, and the lugs 42 and cooperating recesses 45 will serve to align the head and post in one of several predetermined positions of angular adjustment. The head 28 is conveniently secured within the socket 44 by providing this head with an annular slot 46 adapted to receive a pin 47 projecting into the same from the collar 43, spaced holes 48 preferably being formed in this collar to receive the pin.

When it is desired to assemble the liquid gauge forming the subject-matter of this invention, it is first necessary to determine whether the float is to be mounted to swing longitudinally of the tank, or transversely of the same, and also to determine the direction it may be desirable to have the float stem project with respect to the post 17. Then the post 17 is secured to the head 16 so that the float will swing in the desired plane while the matter upon the indicator dial will stand in a vertical position with respect to the position from which it will normally be observed. This angular adjustment is accomplished by the cooperating lugs 42 and recesses 45 which prevent the head and post from being assembled except when they bear one of several predetermined positions to each other, and after the upper end of the post has been inserted in its socket it is secured therein by the pin 47. The liquid gauge is then ready to be mounted in the tank by simply inserting the float and the post to which the former is secured through the ring 21 and securing the casing 18 therein by the threaded nut 27. The pin 47 is prevented from moving out of its proper position so long as the gauge is mounted within a tank, due to the arrangement whereby the downwardly projecting collar 24 upon the ring 21 covers the ends of this pin. The slot 51 in the head 18 is provided to receive the end of a tool when it is desired to pry the head out of its seat in the ring 21, and the notches 52 serve as clearance spaces for the tool.

It may be desirable to provide stops to limit the angle through which the float is permitted to swing, and this is very satisfactorily accomplished by providing a U-shaped member 49 having spaced legs 50. This member is preferably secured in straddling engagement with one of the lugs 30 by a screw 34, with the legs 50 positioned to extend into the path of movement of the stem 32. After the stop member 49 has been adjusted angularly to the desired position, it may be secured in the same by the pin 36.

A liquid gauge, when constructed in accordance with this invention, may have all the parts of the same, with the exception of the ring 21 and nut 27, assembled as required by the conditions met in the particular type of tank in which the same is to be used, after which it is unnecessary to disturb this assemblage as the post having the head secured thereto in the desired position of adjustment, and the float secured thereto, may be inserted through the ring 21 after the latter has been secured in place upon the tank, and then all the parts may be readily secured in place for use by simply applying the nut 27.

The stop 49, in addition to limiting the angular movement of the float, serves also to hold the float in such a position that when the gauge is placed in the tank in which it is to be used, the float will extend from the post 17 in the predetermined direction. For example, when the gauge is to be used in a tank as shown in Fig. 2, the float should extend to the right with respect to the post 17 in order to clear the adjacent baffle plate 13, the stop 49 will support the float in such a position that there is no likelihood of the same projecting in the wrong direction within the tank. Furthermore, after the head and post have been secured together in the desired predetermined relation, there is no likelihood of the float being turned to an improper position within the tank, since the pin 26 cooperates with the groove 25 in the ring 21 to prevent these parts from being assembled in any position other than that desired.

It will be understood that since the bar magnet is adjustably secured to the rod 39, the magnet will be so adjusted upon this rod that the indicator 20 will travel over the proper portion of the dial as the float moves from the top to the bottom of the tank.

From the foregoing description, when read in connection with the drawings, it will be seen that the parts of the gauge may be readily assembled to meet the different conditions met with in different tanks, so that it is unnecessary to vary the construction of the gauge parts to adapt the same for use in differently constructed tanks.

In the application of the present gauge to certain tanks it may be necessary to change the length of the stem 32, but this is a very simple matter, since the floats may be made up with relatively long stems which will permit the same to be given the desired length when secured to the shaft 33.

Claims:

1. A gauge for measuring the depth of liquids, comprising, in combination, a head member having an indicator, a body member having a float swingingly mounted thereupon and operatively connected to said indicator, one of said members having a socket in which an end of the other member is slidably received in any one of several predetermined positions of angular adjustment, the end insertable within said socket having an annular groove formed about the same, and a pin positioned to project into said groove from the socket member to secure said members together.

2. A gauge for measuring the depth of liquid comprising, in combination, a head having an indicator, a post having a float pivotally secured thereto, means including a pin for securing said head and post together, a supporting ring in which said head is mounted, said ring constructed to project over an end of said pin to retain the same in place, and means for operatively connecting said float to said indicator.

3. In a liquid gauge for tanks and the like, in combination, a tank engaging ring, a casing mounted in said ring, said ring and casing having a projection on one and a depression in the other for determining the relation of the casing to the ring, a dial within said casing, an indicator cooperating therewith, a bracket having an end insertable within said casing, said end and casing having projections on one and depressions on the other to limit the angular adjustment of said end within the casing to different positions ninety degrees apart, and a float carried by said bracket and operatively connected to said indicator.

4. In a liquid gauge for tanks and the like, in combination, a tank engaging ring, a casing mounted in said ring, said ring and casing having a projection on one and a depression in the other for determining the relation of the casing to the ring, a dial within said casing, an indicator cooperating therewith, a bracket constructed to be secured to said casing, said bracket and casing having a projection on one and depressions in the other to limit the angular adjustment of the bracket about its longitudinal axis relative to the casing to predetermined positions angularly spaced, and a float carried by said bracket and operatively connected to said indicator.

5. A liquid gauge for tanks, comprising in combination, a casing having an indicator therein, a ring secured to a tank and constructed to receive said casing, the ring and casing having a projection on one and a depression in the other for securing the casing at a predetermined angular adjustment within the ring, a post extending from the casing, means for securing the post to the casing in different positions of angular adjustment and constructed to restrict the assemblage to predetermined positions of angular adjustment, and a float connected to the post and operatively connected to the indicator.

6. A liquid gauge for tanks, comprising in combination, a casing having an indicator for indicating the height of liquid in the tank, means for securing the casing to the tank in a predetermined position of angular adjustment, a post constructed to extend from the casing into the tank, means for securing the post to the casing in different positions of angular adjustment and constructed to restrict the assemblage to predetermined positions of angular adjustment a fixed number of degrees apart, and a float connected to the post and operatively connected to the indicator.

7. A liquid gauge for tanks, comprising in combination, a casing provided with a socket having notches formed in the inner wall of the socket ninety degrees apart, a post constructed to extend from the casing into the tank and having a head that fits said socket, a projection on said head adapted to enter said notches and to restrict the insertion of the head in the socket to positions of adjustment of the post about its longitudinal axis ninety degrees apart, an indicator mounted upon the casing, and a float connected to the post and operatively connected to the indicator.

8. A liquid gauge for tanks, comprising in combination, a casing having an indicator for indicating the height of liquid in the tank, a post constructed to project into the tank when connected to the casing, a float pivotally mounted upon the post to swing in a single plane, means for securing the post to the casing in different positions of angular adjustment including projections on one and cooperating recesses on the other constructed to restrict the assemblage to predetermined positions of angular adjustment of the post about its longitudinal axis and means for imparting movement of the float to the indicator.

9. A liquid gauge for tanks, comprising in combination, a casing having an indicator for indicating the height of liquid in the tank, a post constructed to project into the tank when connected to the casing, a float pivotally mounted upon the post, means for securing the post to the casing in different positions of angular adjustment and constructed to restrict the assemblage to predetermined positions of angular adjustment of the post about its longitudinal axis, and means for imparting movement of the float to the indicator.

In testimony whereof, I have signed my name to this specification.

GEORGE P. GREGORY.